United States Patent Office 2,913,341
Patented Nov. 17, 1959

2,913,341

DRY GELATIN-CONTAINING DAIRY PRODUCTS AND METHOD OF MAKING SAME

Ernst Albert Steigmann, Stoneham, Mass., assignor to General Foods Corporation, White Plains, N.Y., a corporation of Delaware No Drawing. Application April 15, 1957
Serial No. 652,667

8 Claims. (Cl. 99—56)

This invention relates to a dry dairy product. More specifically, it relates to a method of obtaining dried dairy products characterized by extended shelf life, by retention of desirable flavor and taste, and particularly by freedom from oxidative deterioration.

It is well known to those skilled-in-the-art that dried dairy products, i.e., dried milk powder and dried egg powder, can be prepared and that they find a wide variety of uses. Such materials, particularly dried milk solids, are easily handled and can be stored under less exacting conditions than the precursor materials from which they are prepared and accordingly they find high acceptance in the trade and in the hands of the consumer.

These dried dairy products are commonly prepared by either drum drying or spray drying. In the former technique, the liquid dairy material is placed on a rotating surface where it is heated to high temperatures. When spray drying is employed, the temperatures to which the material is subjected may be somewhat lower; however the liquid is finely atomized and intimately contacted with warm air. Although the dried product, in either case, is eminently satisfactory for many purposes, it is found that it readily deteriorates and that it has a short shelf life. On storage, these materials may develop a noticeable off-flavor and a darkening, and may even become rancid. The product, otherwise acceptable, soon becomes unsatisfactory because of its off-flavor and/or its bad taste.

In view of the fact that the several liquid dairy products, after drying, are generally characterized by the same attributes, insofar as this invention is concerned, specific reference will hereinafter be made to milk. It will be understood that the term liquid dairy products, however, is intended to include skim milk, whole milk, and eggs.

Prior art techniques have attempted to eliminate these undesirable effects and to extend the shelf life of dried dairy products by use of a variety of techniques of preparation of the product or by addition thereto, before or after processing of various materials. None of these approaches have permitted attainment of the desired results. Thus there is on the market no dried dairy product powder which is characterized by an extended shelf life and by high degree of stability.

It is an object of this invention to prepare a dried liquid dairy product characterized by extended shelf life, retention of desirable flavor, color, and taste, and freedom from oxidation. Other objects will be apparent to those skilled-in-the-art on inspection of the following specification.

According to certain of its aspects, the preferred technique by which the process of this invention is carried out comprises the steps of treating gelatin with a reducing metal-complexer, forming a mixture of the so-treated gelatin with a liquid dairy product, and drying the said mixture to obtain a dried dairy product possessing the eminently satisfactory characteristics herein set forth.

The novel product of this invention comprises the product of the above-noted process and may be a composition wherein the treated gelatin is intimately associated with the dried dairy product.

The desired properties of the novel product are directly attributable to the particular nature of the gelatin employed. Use of gelatin, treated as hereinbefore disclosed, permits attainment of eminently desirable properties in the resulting dairy products.

The reducing metal complexes which are particularly adapted to be employed in connection with this invention are characterized generally by their ability to form complexes with heavy metals while simultaneously acting as deterrents to oxidative deterioration of the dairy product. Among the types of reducing metal-complexers found to be useful are thiols (i.e. mercaptans), typified by glutathion, cysteine, 2-mercaptobenzthiol, 2-mercaptobenzimidazol, and 2-mercaptobenzoxazol; thiouracils, typified by thiouracil and methylthiouracil; thiocarbamates, typified by dialkyl dithiocarbamates such as diethyl dithiocarbamate and dimethyl dithiocarbamate; and sulfinates such as sodium benzene sulfinate.

Reducing metal complexers also include potential thiols which by opening of a heterocyclic ring form metal-complexing thiols. Typical of these are thiazolidine 4-carboxylic acid, 2,4-dioxothiazolidine, and thioctic acid. The term thiols is intended to include potential thiols.

Other particular reducing metal complexers which can be used in connection with this invention include gluconic acid, 8-hydroxyquinoline, kojic acid (i.e. 5-hydroxy-2-(hydroxymethyl)-1,4-pyrone), 6-hydroxy chroman, and 5 hydroxy coumarin.

The preferred compounds which can be used in this invention include cysteine, glutathion, thiouracil, gluconic acid, and 5-hydroxy coumarin.

The treating of gelatin with reducing metal-complexer may be effected according to the preferred technique by adding the reducing metal complexer to the gelatin while the latter is in solution. This can be done during the course of preparation of the gelatin, before the gelatin solution is dried to form dry gelatin, after the dry gelatin has been redissolved to form a solution, or after the dry gelatin has been added to the liquid dairy product. If desired, the reducing metal-complexer can be added to the solid gelatin before the same is dissolved in solution. Preferably the pH of the solution containing the reducing metal complexer will be about 4.0–9.0. 0.1–5 parts of reducing metal complexer may be added per 100 parts of gelatin.

Preferably the treated gelatin will be added to the liquid dairy product in amount which is typically less than about 30% by weight of that of the dried dairy product. Amounts as low as 1%–5% may be sufficient to give improved properties and to render the resultant dairy product free from oxidation for an extended period of time.

When the dairy product to be rendered stable against oxidation is whole milk, the treated gelatin will be added to the whole milk in amount which may be 0.1% to 2%, preferably 0.5% by weight of the milk. When the dairy product is skim milk, the treated gelatin will be added thereto in amount which may be 0.3% to 3%, say 0.5% by weight of the skim milk.

When the dairy product is egg, the treated gelatin will preferably be added in the form of a 7% to 15%, say 10% aqueous solution to the egg and the resulting mixture homogenized. The amount of treated gelatin may be 1% to 10%, say 3% of the weight of the egg.

In any event, the resulting mixture of treated gelatin and dairy product will be dried, as by e.g. spray drying, to give a solid dairy product stabilized against oxidation, which contains 1% to 30%, say 5% of treated gelatin.

The resulting combination contains dairy solids admixed with treated gelatin. It is characterized by stability after extended periods of storage. More particularly, the composition is resistant to oxidative deterioration which would normally render the color, flavor, odor, and general appearance unsatisfactory.

According to a specific embodiment of this invention 10 grams of gelatin was dissolved in 2,000 grams of whole milk. 2 grams of cysteine was then added and the mixture agitated until solution was effected. This mixture may be spray dried by spraying the same at 140° F. into a spray drier having an inlet air temperature of 230° F. and an outlet air temperature of 110° F.

The resulting finely divided dried milk recovered from drying operations may contain about 5% gelatin and about 95% skim milk solids. The content of reducing metal-complexer of the product may be 1% or less.

It is found after storage that this product retained its original whitish color, fine texture, clean odor, desirable taste, and its other desirable properties. Samples of (a) pure spray dried whole milk and (b) of mixed spray dried whole milk and gelatin which had not been treated according to the process of this invention were found after the same extended storage period to have turned rancid, to have developed a dark color, and an off-flavor, and to be otherwise generally unsatisfactory and unsuitable for use as a food product.

It will be understood that when the stabilized dairy product is to be used for edible purposes, as is usually the case, only those reducing metal-complexers which are edible and non-toxic will be employed.

Although this invention has been described in terms of a specific embodiment, it will be apparent to those skilled-in-the-art that various modifications and changes may be made which fall within the scope of the invention.

I claim:

1. In a method of preparing a dry dairy product which includes the steps of forming a liquid mixture of a dairy product and gelatin and drying the mixture, the improvement which comprises mixing with the gelatin while in liquid state from 0.1 to 5 parts of a reducing metal complexer per 100 parts of gelatin.

2. A method as defined in claim 1 wherein said reducing metal complexer is a thiol.

3. A method as defined in claim 1 wherein said reducing metal complexer is selected from the group consisting of cysteine, glutathion, thiouracil, gluconic acid, and 5-hydroxy coumarin.

4. A method as defined in claim 1 wherein said reducing metal complexer is cysteine.

5. A dry dairy product comprising a dry mixture of a dairy product, gelatin, and from 0.1 to 5 parts of a reducing metal complexer per 100 parts of gelatin and in intimate mixture with said gelatin, said product having been prepared by the process defined in claim 1.

6. A dry dairy product as defined in claim 5 wherein said reducing metal complexer is a thiol.

7. A dry dairy product as defined in claim 5 wherein said reducing metal complexer is selected from the group consisting of cysteine, glutathion, thiouracil, gluconic acid, and 5-hydroxy coumarin.

8. A dry dairy product as defined in claim 5 wherein said reducing metal complexer is cysteine.

References Cited in the file of this patent

UNITED STATES PATENTS

| | | |
|---|---|---|
| 1,159,455 | Wieda | Nov. 9, 1915 |
| 2,011,465 | Balls et al. | Aug. 13, 1935 |
| 2,191,206 | Schwartz | Feb. 20, 1940 |
| 2,634,210 | Kimball | Apr. 7, 1953 |

OTHER REFERENCES

Hill et al.: Organic Chemistry, 1943, page 232.

Martell et al.: Chemistry of the Chelate Compounds, 1952, pages 1 and 385–386.